(12) United States Patent
Wu

(10) Patent No.: US 11,098,789 B2
(45) Date of Patent: Aug. 24, 2021

(54) LINEAR ACTUATOR

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/854,737

(22) Filed: Apr. 21, 2020

(65) Prior Publication Data

US 2020/0248788 A1 Aug. 6, 2020

Related U.S. Application Data

(63) Continuation of application No. 15/792,658, filed on Oct. 24, 2017, now Pat. No. 10,683,917.

(30) Foreign Application Priority Data

Sep. 18, 2017 (TW) ................................ 106213874

(51) Int. Cl.
  *F16H 25/20* (2006.01)

(52) U.S. Cl.
  CPC ..... *F16H 25/2025* (2013.01); *F16H 25/2015* (2013.01); *F16H 25/2021* (2013.01); *F16H 2025/204* (2013.01); *F16H 2025/2031* (2013.01); *F16H 2025/2037* (2013.01); *F16H 2025/2046* (2013.01); *F16H 2025/2071* (2013.01); *F16H 2025/2075* (2013.01)

(58) Field of Classification Search
  CPC ............. F16H 25/2025; F16H 25/2015; F16H 25/2021; F16H 2025/2031; F16H 2025/2037; F16H 2025/204; F16H 2025/2046; F16H 2025/2071; F16H 2025/2075

See application file for complete search history.

(56) References Cited

U.S. PATENT DOCUMENTS

| | | | | |
|---|---|---|---|---|
| 5,775,469 A * | 7/1998 | Kang | ...................... | F16F 15/03 188/162 |
| 8,567,272 B2 * | 10/2013 | Hyun | ................... | H02K 1/2733 74/89.34 |
| 9,790,969 B2 * | 10/2017 | Fenn | ...................... | F15B 15/088 |
| 9,933,058 B1 * | 4/2018 | Muster | ................ | F16H 25/2015 |
| 10,697,527 B2 * | 6/2020 | Pellenc | ............... | F16H 25/2223 |
| 10,974,596 B2 * | 4/2021 | Barnabo | ................ | B60K 23/08 |
| 2006/0156844 A1 * | 7/2006 | Yamashita | ........... | F16H 25/2214 74/424.86 |

(Continued)

*Primary Examiner* — David M Fenstermacher
(74) *Attorney, Agent, or Firm* — Chun-Ming Shih; HDLS IPR Services

(57) ABSTRACT

A linear actuator includes a sliding rod, a motor and a buffer assembly. The motor connects the sliding rod to drive the sliding rod. The buffer assembly is disposed at an end of the sliding rod and includes an elastic element and an outer sleeve. The elastic element is received in the outer sleeve. The sliding rod connects the outer sleeve. The outer sleeve is movable along an axial direction of the sliding rod. The elastic element separately pushes an inner wall of the outer sleeve and the sliding rod. The elastic element is pre-compressed along the axial direction of the sliding rod. The buffer assembly can absorb vibration and impact caused by the motor driving the sliding rod.

9 Claims, 9 Drawing Sheets

(56) References Cited

U.S. PATENT DOCUMENTS

| | | | | |
|---|---|---|---|---|
| 2007/0169578 A1* | 7/2007 | Christensen | ........ | F16H 25/2021 |
| | | | | 74/89.37 |
| 2008/0250844 A1* | 10/2008 | Gartner | ................. | F16F 9/3264 |
| | | | | 73/11.07 |
| 2010/0308518 A1* | 12/2010 | Michel | ................. | B60G 17/021 |
| | | | | 267/218 |
| 2011/0062679 A1* | 3/2011 | Shirai | .................... | B62K 25/08 |
| | | | | 280/276 |
| 2015/0377329 A1* | 12/2015 | Wu | ......................... | F16H 25/20 |
| | | | | 74/89.38 |
| 2017/0204927 A1* | 7/2017 | Alpers | .................... | F16F 1/121 |

* cited by examiner

LINEAR ACTUATOR

CROSS-REFERENCE TO RELATED APPLICATIONS

This application is a continuation application of U.S. application Ser. No. 15/792,658 filed on Oct. 24, 2017, which claims priority to Taiwanese Patent Application No. 106213874, filed on Sep. 18, 2017. The entire disclosure of which is incorporated by reference herein.

BACKGROUND OF THE INVENTION

1. Technical Field

The invention relates to linear actuators, particularly to a linear actuator with a buffer assembly and the buffer assembly thereof.

2. Related Art

A linear actuator is a mechanic device for moving an object. Generally, it is usually used in high load applications. The structural strength of existing linear actuators is enough to bear heavy loads, but the structures of linear actuators are primarily of high rigidity. Variations of sudden external forces cannot be buffered. This is easy to damage a linear actuator.

SUMMARY OF THE INVENTION

The invention provides a linear actuator with a buffer assembly and the buffer assembly thereof.

The invention provides a linear actuator, which includes a sliding rod, a motor and a buffer assembly. The motor connects the sliding rod to drive the sliding rod. The buffer assembly is disposed at an end of the sliding rod and includes an elastic element and an outer sleeve. The elastic element is received in the outer sleeve. The sliding rod connects the outer sleeve. The outer sleeve is movable along an axial direction of the sliding rod. The elastic element separately pushes an inner wall of the outer sleeve and the sliding rod. The elastic element is pre-compressed along the axial direction of the sliding rod.

In the linear actuator of the invention, a connecting base is provided on the outer sleeve. A sliding spindle is arranged in the outer sleeve. A stopper is provided in the sliding rod. A flange is formed on the sliding spindle. An end of the sliding spindle connects the outer sleeve. The other end of the sliding spindle passingly connects the sliding rod and is movable along an axial direction of the sliding rod. The flange abuts against the stopper to limit a traveling end of the outer sleeve's extendedly movement against the sliding rod. The sliding rod is provided with a connecting sleeve. An end of the connecting sleeve passingly connects the sliding rod and forms a stopper. The other end of the connecting sleeve movably and passingly connects the outer sleeve. The elastic element is a rod-shaped spring. The sliding spindle passingly connects the elastic element.

In the linear actuator of the invention, the sliding spindle is threadedly connected to the outer sleeve. The sliding rod is formed with a limiting ring for blocking the outer sleeve. The limiting ring limits a traveling end of the outer sleeve's movement against the sliding rod. The limiting ring can be threadedly connected onto the sliding rod. The sliding rod may be provided with a connecting sleeve. An end of the connecting sleeve passingly connects the sliding rod. The other end of the connecting sleeve movably and passingly connects the outer sleeve. The limiting ring is disposed outside the connecting sleeve. The limiting ring may be threadedly connected outside the connecting sleeve.

The invention also provides a buffer assembly, which includes an elastic element, an outer sleeve and a connecting sleeve. An end of the connecting sleeve movably passes through and connects the outer sleeve. The outer sleeve is movable along an axial direction of the connecting sleeve. The elastic element is received in the outer sleeve and separately pushes the outer sleeve and the connecting sleeve. The elastic element is pre-compressed along an axial direction and the axial direction of the connecting sleeve.

In the linear actuator of the invention, a connecting base is provided on the outer sleeve. A sliding spindle is arranged in the outer sleeve. A stopper is provided in the other end of the connecting sleeve. A flange is formed on the sliding spindle. An end of the sliding spindle connects the outer sleeve. The other end of the sliding spindle passingly connects the connecting sleeve and is movable along an axial direction of the connecting sleeve. The flange abuts against the stopper to limit a traveling end of the outer sleeve's extendedly movement against the connecting sleeve. The elastic element is a rod-shaped spring. The sliding spindle passingly connects the elastic element. A sliding spindle is formed in the connecting sleeve along a central axis of the connecting sleeve. An end of the sliding spindle connects an inner wall of the connecting sleeve. A stopper is formed on a lateral side of the other end of the sliding spindle. The sliding spindle passingly connects the elastic element. The elastic element is blocked by the stopper to indirectly push the sliding rod. The sliding spindle is threadedly connected to the outer sleeve. The connecting sleeve is formed with a limiting ring for blocking the outer sleeve. The limiting ring limits a traveling end of the outer sleeve's movement against the connecting sleeve. The limiting ring is threadedly connected onto the connecting sleeve.

The linear actuator of the invention utilizes its buffer can assembly absorb vibration and impact caused by the motor driving the sliding rod.

DETAILED DESCRIPTION OF THE INVENTION

Figure 1:
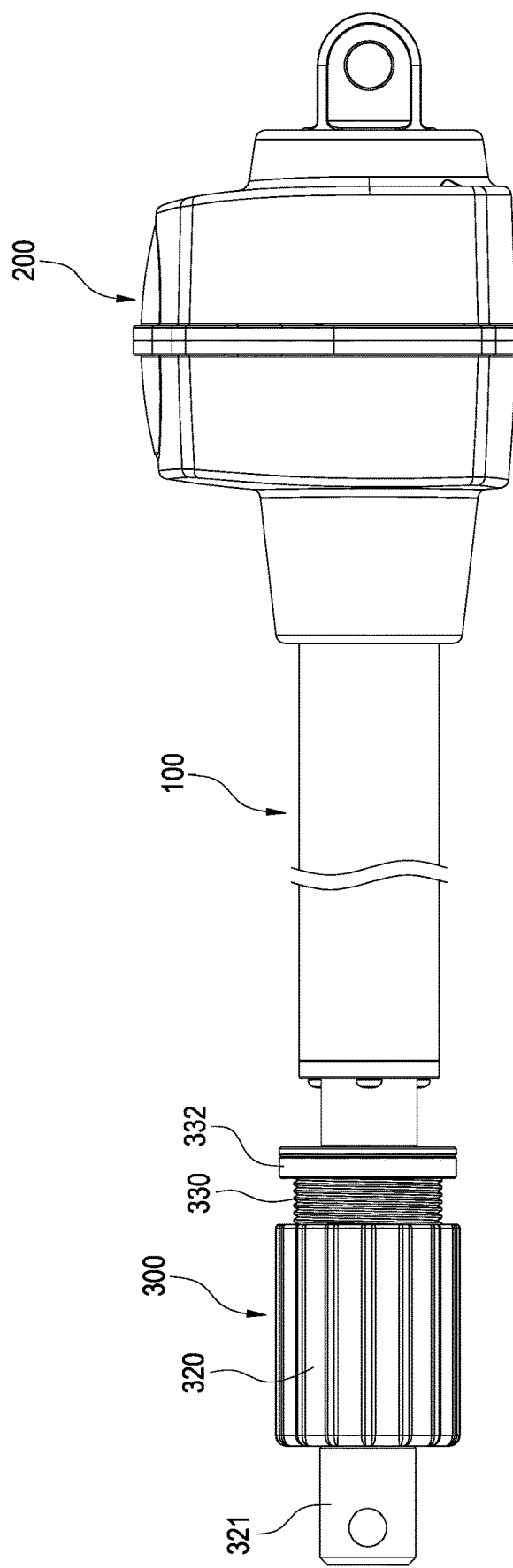
FIG. 1 is a perspective view of the linear actuator of the first embodiment of the invention.
Figure 2:
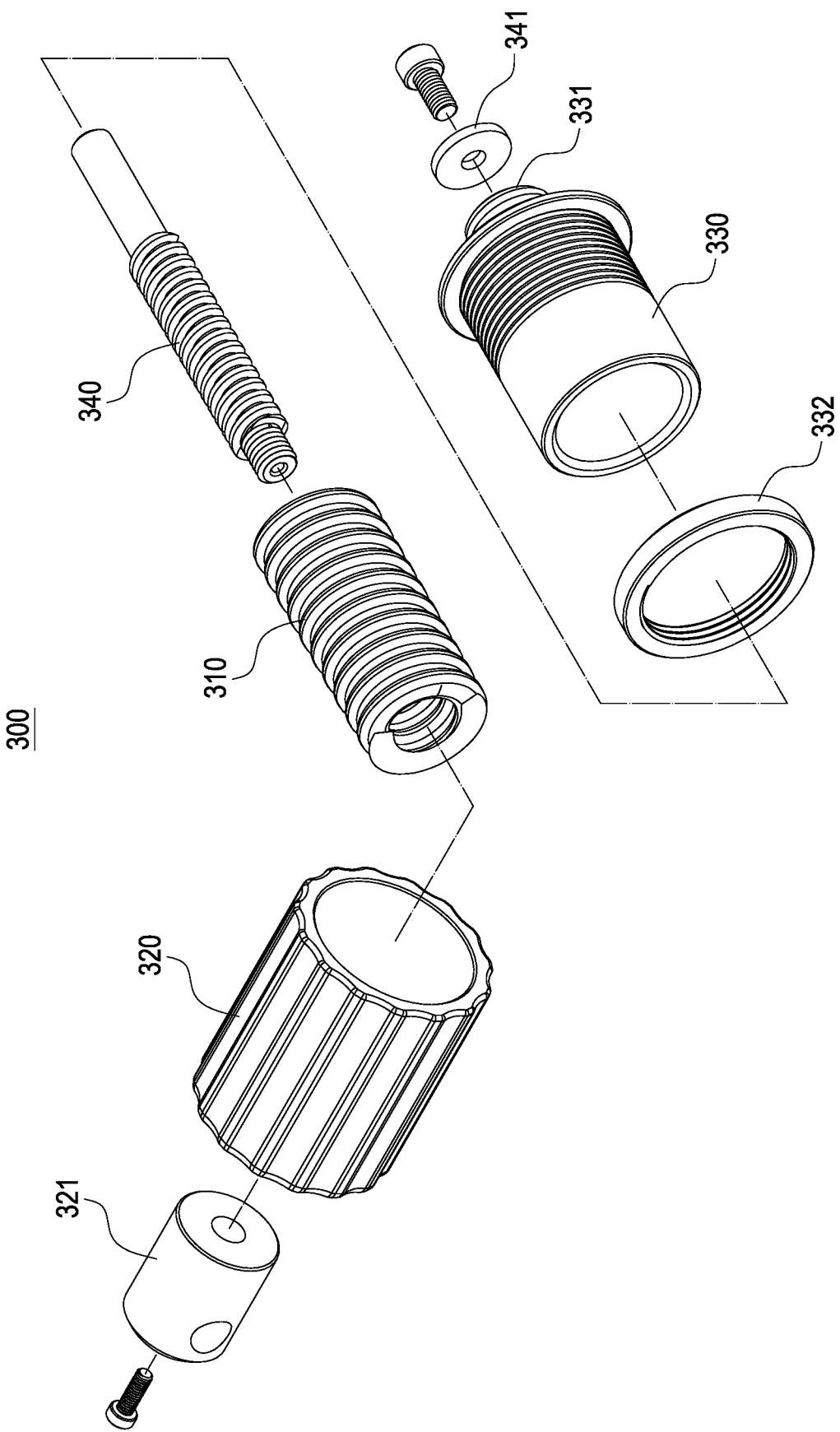
FIG. 2 is an exploded view of the buffer assembly of the linear actuator of the first embodiment of the invention.
Figure 3:
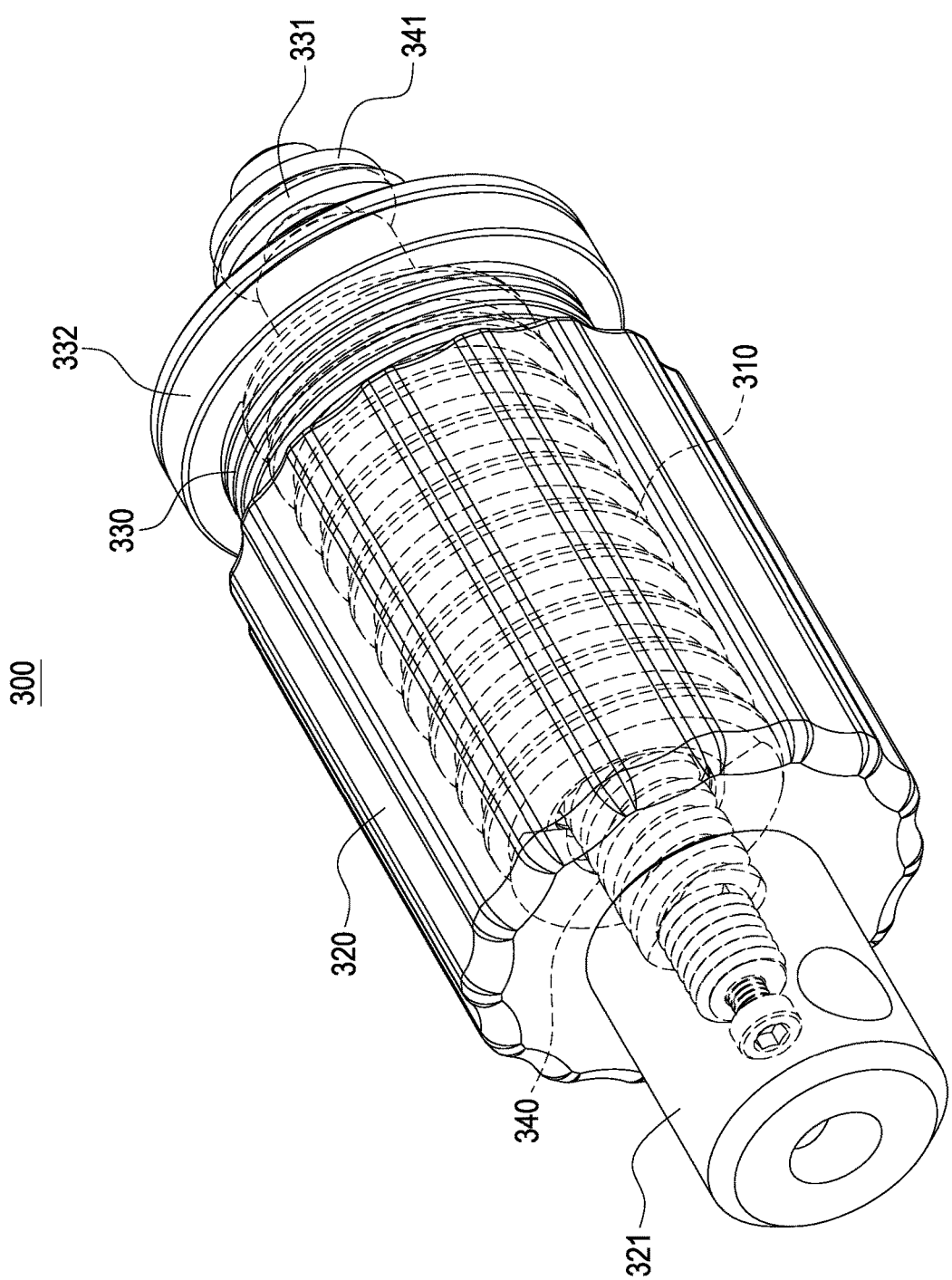
FIGS. 3 and 4 are exploded views of the buffer assembly of the linear actuator of the first embodiment of the invention.
Figure 4:
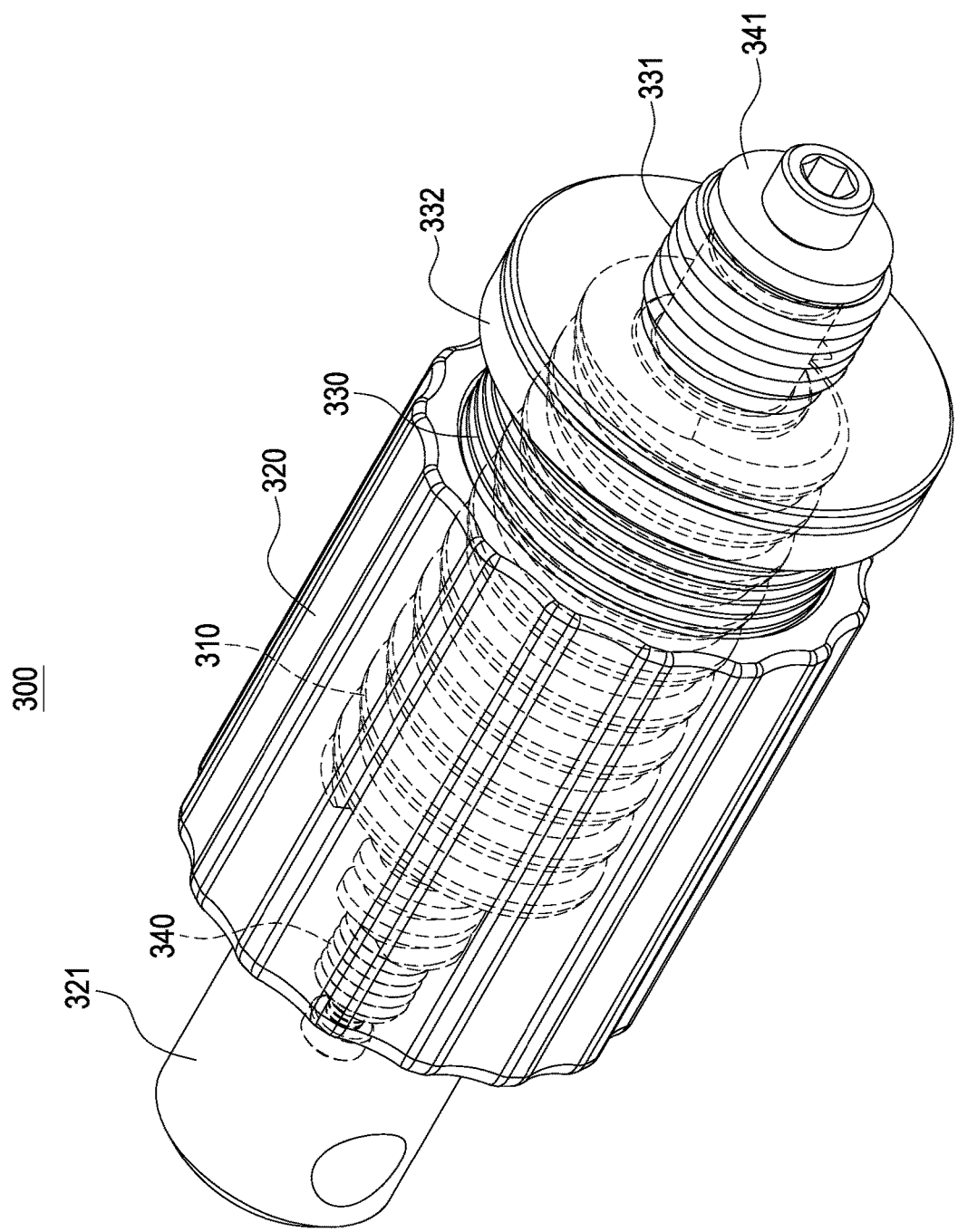
Figure 5:
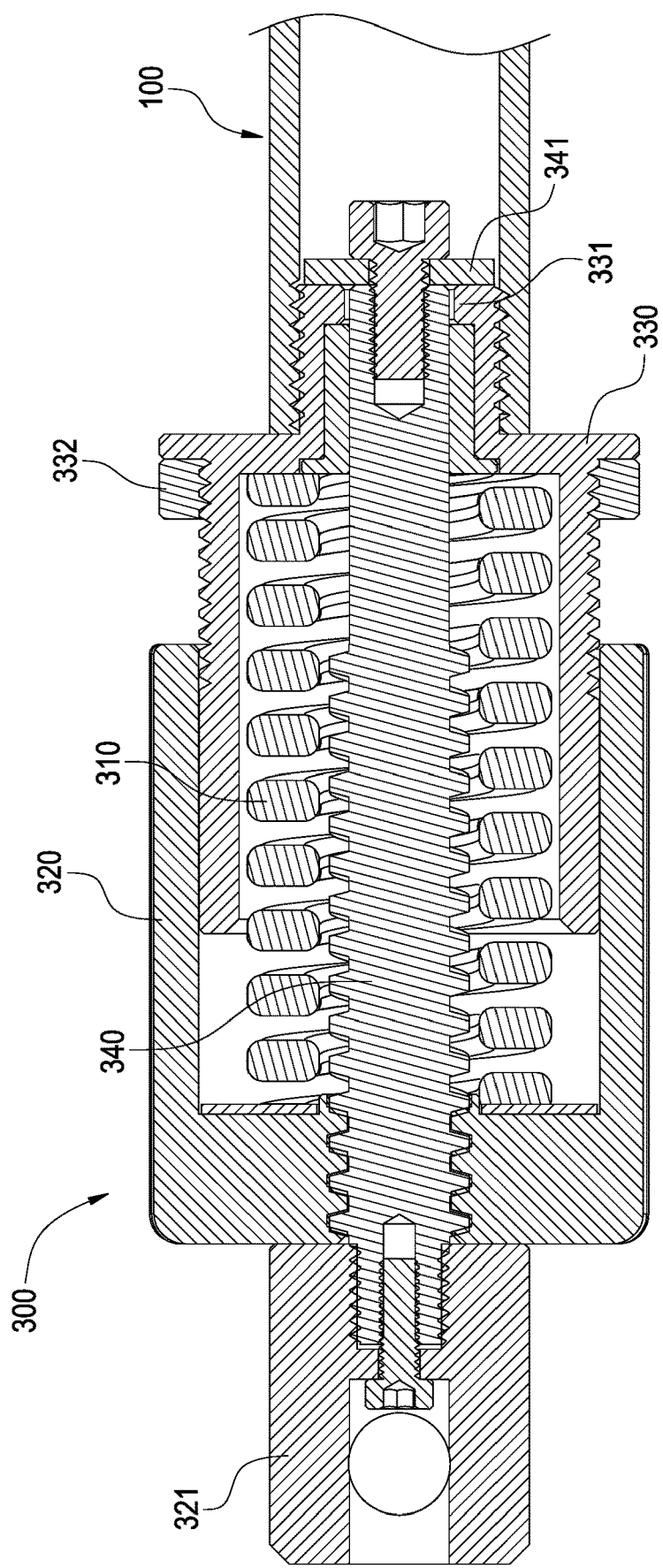
FIGS. 5-7 are schematic views of the linear actuator of the first embodiment of the invention in use.

Please refer to FIGS. 1 and 5. The first embodiment of the invention provides a linear actuator, which includes a sliding rod 100, a motor 200 and a buffer assembly 300.

In this embodiment, the sliding rod 100 is preferably composed of a plurality of tubes overlapping each other (not shown). A lead screw (not shown) with a nut (not shown) is arranged in the sliding rod 100. When the nut connects a tube, the lead screw is disposed at another tube, when the lead screw is rotated, the nut will be driven to move along the lead screw to expand or retract the sliding rod 100. Detailed structure of the sliding rod 100 is well-known, so it will not be further described.

The motor 200 is arranged at an end of the sliding rod 100 and connects the sliding rod 100 to drive the sliding rod 100. Preferably, the motor 200 connects a lead screw to rotate the lead screw and to drive the sliding rod 100 to expand or retract.

Please refer to FIGS. 2-5. The buffer assembly 300 is arranged at another end of the sliding rod 100. A stopper 331 is provided in this end of the sliding rod 100.

In this embodiment, the buffer assembly 300 preferably includes an elastic element 310, an outer sleeve 320 and a connecting sleeve 330 for connecting the sliding rod 100. The elastic element 310 is received in the outer sleeve 320. A connecting base 321 is disposed on the outer sleeve 320 for rotatably fixing to bear external load.

In this embodiment, preferably, the elastic element 310 is a rod-shaped spring. An end of the elastic element 310 passes through the outer sleeve 320 and the elastic element 310 is pre-compressed along an axial direction of the sliding rod 100. Two ends of the elastic element 310 separately push an inner wall of the outer sleeve 320 and an end of the sliding rod 100. It may directly or indirectly pushes the sliding rod 100. In this embodiment, the elastic element 310 pushes the connecting sleeve 330 and then indirectly pushes the sliding rod 100.

The buffer assembly 300 can be installed to the sliding rod 100 through the connecting sleeve 330. An end of the connecting sleeve 330 connects the sliding rod 100 and forms the stopper 331. A sliding spindle 340 passingly connects the connecting sleeve 330 and is movable along an axial direction of the connecting sleeve 330. The other end of the connecting sleeve 330 movably and passingly connects the outer sleeve 320.

Please refer to FIG. 5. A sliding spindle 340 is arranged in the outer sleeve 320 to limit an axial motion along the sliding rod 100 of the outer sleeve 320. In this embodiment, the sliding spindle 340 preferably passingly connects the elastic element 310 and coaxially arranged with the outer sleeve 320. An end of the sliding spindle 340 connects the outer sleeve 320. Preferably, the sliding spindle 340 threadedly connects the outer sleeve 320. The other end of the sliding spindle 340 is outward formed with a flange 341. This end of the sliding spindle 340 passingly connects the sliding rod 100 and the sliding spindle 340 is movable along an axial direction of the sliding rod 100.

When the outer sleeve 320 extendedly moves against the sliding rod 100 to the flange 341 to abut against the stopper 331, the flange 341 can limit an extended traveling end of the outer sleeve 320. A user may rotate the outer sleeve 320 to make the outer sleeve 320 and the sliding spindle 340 relatively rotate along a coaxial direction thereof, and then to make the outer sleeve 320 and the sliding spindle 340 relatively move along a coaxial direction thereof. Thus a predetermined buffering force of the elastic element 310 can be adjusted by adjusting compressing amplitude of the elastic element 310. Also, a moving travel of the outer sleeve 320 can be adjusted.

Figure 6:
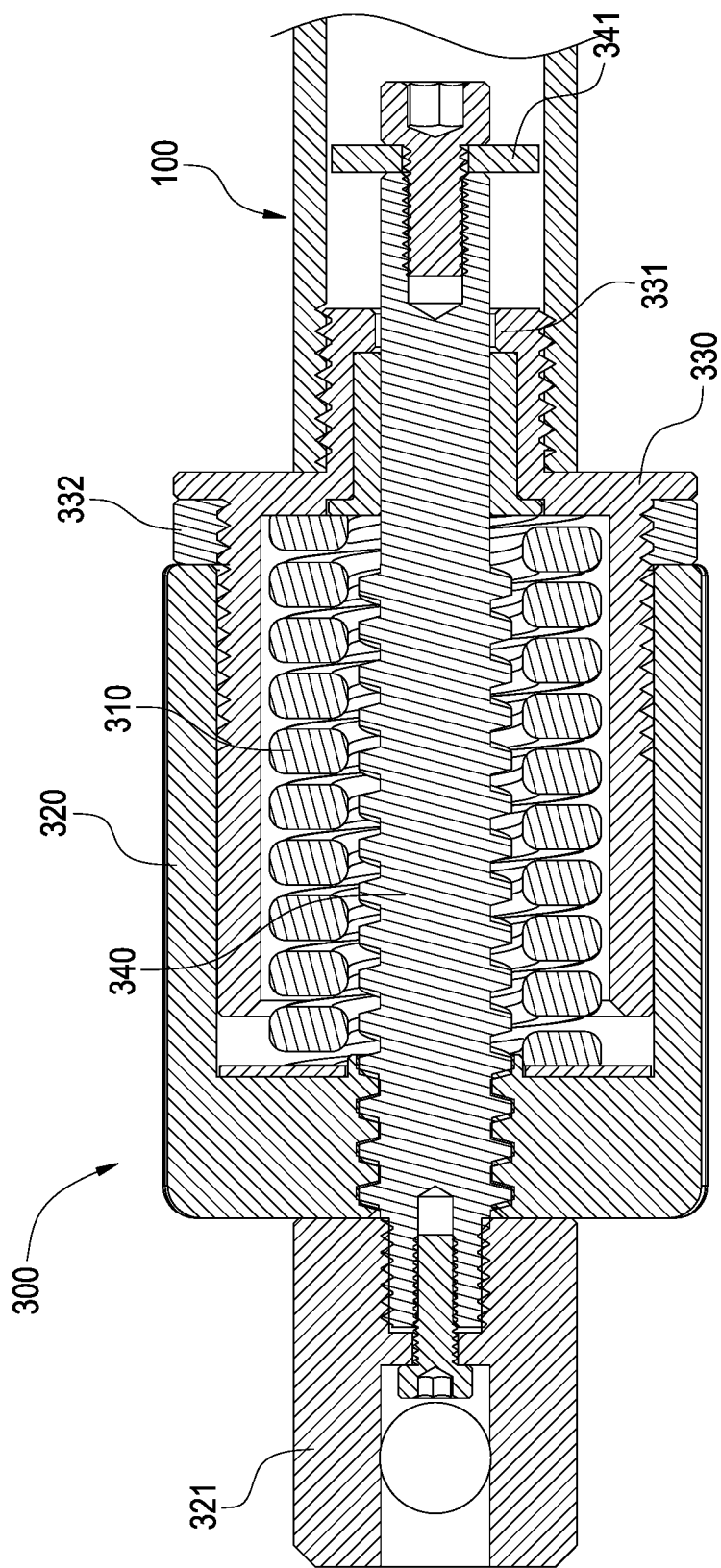

Please refer to FIG. 6. A limiting ring 332 is provided on the sliding rod 100. When the outer sleeve 320 retracts against the sliding rod 100 to abut against the limiting ring 332, the limiting ring 332 can limit a retracting travel end of the outer sleeve 320. In this embodiment, preferably, the limiting ring 332 is disposed on a surface of the connecting sleeve 330, and the limiting ring 332 is threadedly connected onto the connecting sleeve 330.

Figure 7:
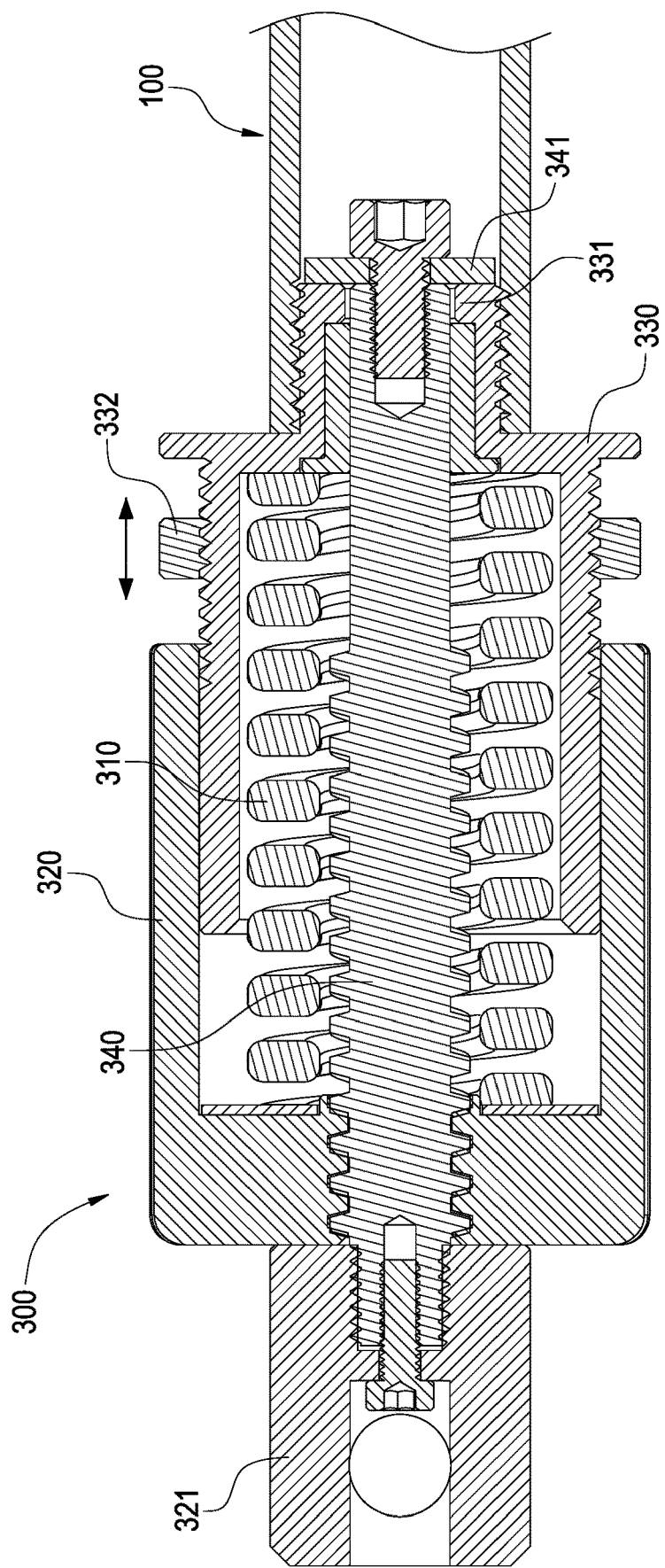

Please refer to FIG. 7. Rotating the limiting ring 332 can move the limiting ring 332 along an axial direction of the sliding rod 100 to change the distance between the limiting ring 332 and the outer sleeve 320. This can adjust a moving travel of the outer sleeve 320.

Please refer to FIG. 6. When the linear actuator suffers from a sudden axial compressive force, the elastic element 310 allows the outer sleeve 320 to retract against the sliding rod 100 to absorb the compressive force. The elastic element 310 can push the outer sleeve 320 to expand against the sliding rod 100 to resist the compressive force. As a result, the vibration and impact caused by the motor 200 driving the sliding rod 100 can be absorbed.

The above is a preferred embodiment, but the invention is not limited to this. In the simplest embodiment, the buffer assembly 300 may include the elastic element 310 and the outer sleeve 320. The elastic element 310 is received in the outer sleeve 320. The sliding rod 100 movably and passingly connects the outer sleeve 320 and is coaxially arranged with the outer sleeve 320 to make the outer sleeve 320 movable along an axial direction of the sliding rod 100. Thus the buffer assembly 300 is connected to the sliding rod 100 not through the connecting sleeve 330. The stopper 331 may be directly protrusively formed on an inner wall of the sliding rod 100. The limiting ring 332 may be directly disposed on a surface of the sliding rod 100 and preferably threadedly connected on a surface of the sliding rod 100.

Figure 8:
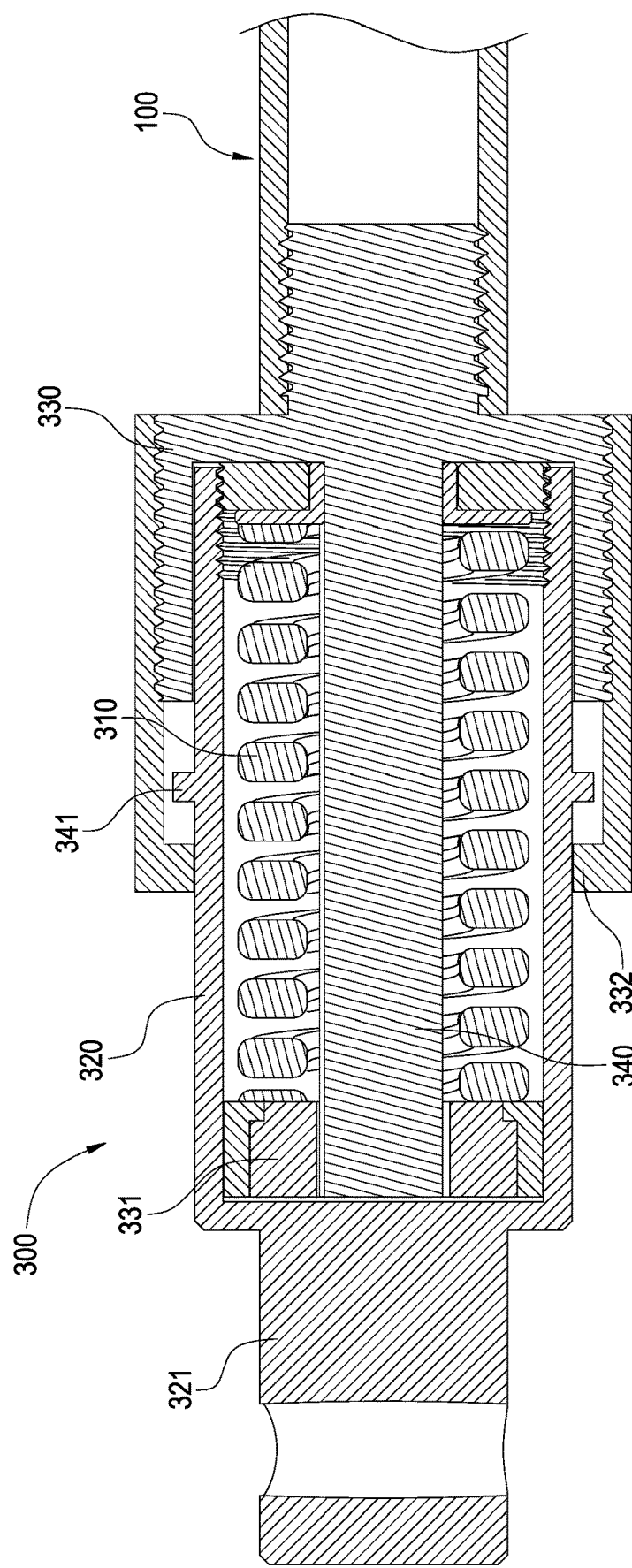
FIGS. 8-9 are schematic views of the linear actuator of the second embodiment of the invention in use.
Figure 9:
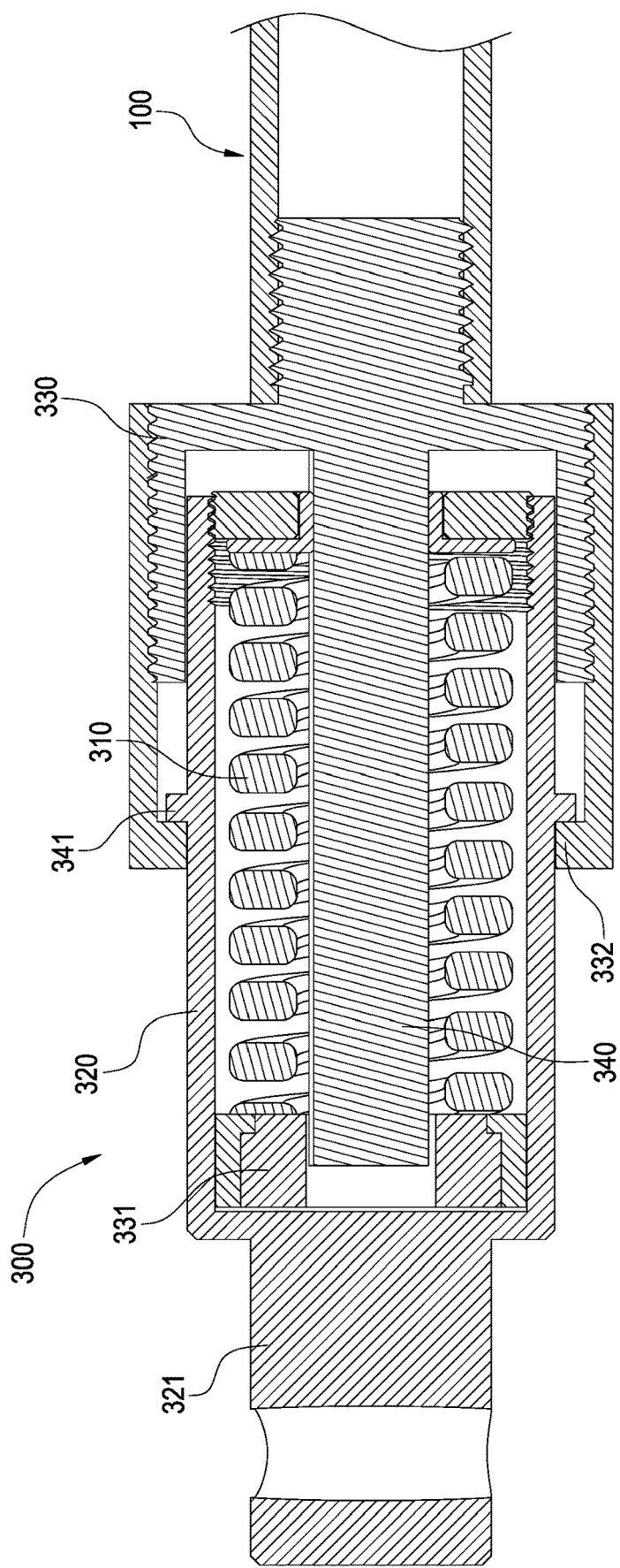

Please refer to FIGS. 1, 8 and 9. The second embodiment of the invention provides a linear actuator, whose sliding rod 100 and motor 200 are the same as the first embodiment. The second embodiment differs from the first embodiment by the structure of the buffer assembly 300 and the connection of it and sliding rod 100.

The buffer assembly 300 is disposed at an end of the sliding rod 100 and the other end thereof is formed with a stopper 331. In this embodiment, the buffer assembly 300 preferably includes an elastic element 310, an outer sleeve 320 and a connecting sleeve 330 for connecting the sliding rod 100. The elastic element 310 is received in the outer sleeve 320. An end of the outer sleeve 320 is open and the other end thereof is closed. A connecting base 321 is disposed on the closed end of the outer sleeve 320 for rotatably fixing to bear external load.

In this embodiment, preferably, the elastic element 310 is a rod-shaped spring. An end of the elastic element 310 passes through the outer sleeve 320 and the elastic element 310 is pre-compressed along an axial direction of the sliding rod 100. Two ends of the elastic element 310 separately push an inner wall of the open end of the outer sleeve 320 and the stopper 331 on the sliding rod 100. It may directly or indirectly pushes the sliding rod 100. In this embodiment, the buffer assembly 300 can be installed to the sliding rod 100 through the connecting sleeve 330. An end of the connecting sleeve 330 is installed to the sliding rod 100. The other end of the connecting sleeve 330 movably connects the outer sleeve 320. A sliding spindle 340 is extendedly formed in the outer sleeve 320 along a central axis of the connecting sleeve 330. An end of the sliding spindle 340 connects an inner wall of the outer sleeve 320. A lateral side of the other end of the sliding spindle 340 is outward formed with the stopper 331. The sliding spindle 340 passingly connects the elastic element 310 and an end of the elastic element 310 pushes the stopper 331.

The outside of the outer sleeve 320 is outward formed with a flange 341. An outer surface of the connecting sleeve 330 is threadedly connected with a limiting ring 332. When the outer sleeve 320 extendedly moves against the sliding rod 100 to the flange 341 to abut against the limiting ring 332, the flange 341 can limit an extended traveling end of the outer sleeve 320. A user may rotate the limiting ring 332 to make the connecting sleeve 330 and the limiting ring 332 relatively rotate along a coaxial direction thereof, and then to make the connecting sleeve 330 and the limiting ring 332 relatively move along a coaxial direction thereof. Thus a moving travel of the outer sleeve 320 can be adjusted.

When the linear actuator suffers from a sudden axial compressive force, the elastic element 310 allows the outer sleeve 320 to retract against the sliding rod 100 to absorb the compressive force. The elastic element 310 can push the outer sleeve 320 to expand against the sliding rod 100 to resist the compressive force. As a result, the vibration and impact caused by the motor 200 driving the sliding rod 100 can be absorbed.

The linear actuator of the invention uses the buffer assembly 300 to absorb vibration and impact caused by the motor 200 driving the sliding rod 100. The elastic element 310 received in the outer sleeve 320 can prevent users from being injured by erroneously touching the elastic element 310. Also, the linear actuator of the invention can adjust a buffering travel and buffering force.

It will be appreciated by persons skilled in the art that the above embodiments have been described by way of example only and not in any limitative sense, and that various alterations and modifications are possible without departure from the scope of the disclosed example as defined by the appended claims.

What is claimed is:

1. A linear actuator comprising:
   a sliding rod;
   a motor, connecting the sliding rod to drive the sliding rod; and
   a buffer assembly, disposed at an end of the sliding rod, including an elastic element and an outer sleeve, the elastic element being received in the outer sleeve, the sliding rod connecting the outer sleeve, the outer sleeve being movable along an axial direction of the sliding rod, the elastic element separately pushing an inner wall of the outer sleeve and the sliding rod, and the elastic element being pre-compressed along the axial direction of the sliding rod,
   wherein a sliding spindle is disposed in the outer sleeve, a stopper is provided in the sliding rod, an outside of the sliding spindle is outward formed with a flange, an end of the sliding spindle connects the outer sleeve, another end of the sliding spindle connects the sliding rod and is movable along an axial direction of the sliding rod, and the flange abuts against the stopper to limit a travel end of an extended movement against the sliding rod of the outer sleeve.

2. The linear actuator of claim 1, wherein the sliding rod is provided with a connecting sleeve, an end of the connecting sleeve connects the sliding rod and forms the stopper, another end of the connecting sleeve movably and connects the outer sleeve.

3. The linear actuator of claim 1, wherein the elastic element is a rod-shaped spring, and the sliding spindle connects the elastic element.

4. The linear actuator of claim 1, wherein the sliding spindle is threadedly connected to the outer sleeve.

5. A linear actuator comprising:
   a sliding rod;
   a motor, connecting the sliding rod to drive the sliding rod; and
   a buffer assembly, disposed at an end of the sliding rod, including an elastic element and an outer sleeve, the elastic element being received in the outer sleeve, the sliding rod connecting the outer sleeve, the outer sleeve being movable along an axial direction of the sliding rod, the elastic element separately pushing an inner wall of the outer sleeve and the sliding rod, and the elastic element being pre-compressed along the axial direction of the sliding rod,
   wherein the sliding rod is provided with a connecting sleeve, an end of the connecting sleeve connects the sliding rod, another end of the connecting sleeve movably connects the outer sleeve, a sliding spindle is extendedly formed in the outer sleeve along a central axis of the connecting sleeve, an end of the sliding spindle connects an inner wall of the outer sleeve, a lateral side of another end of the sliding spindle is outward formed with a stopper, the sliding spindle connects the elastic element, and the elastic element pushes the stopper to indirectly push the sliding rod.

6. A linear actuator comprising:
   a sliding rod;
   a motor, connecting the sliding rod to drive the sliding rod; and
   a buffer assembly, disposed at an end of the sliding rod, including an elastic element and an outer sleeve, the elastic element being received in the outer sleeve, the sliding rod connecting the outer sleeve, the outer sleeve being movable along an axial direction of the sliding rod, the elastic element separately pushing an inner wall of the outer sleeve and the sliding rod, and the elastic element being pre-compressed along the axial direction of the sliding rod,
   wherein a limiting ring is provided on the sliding rod for blocking the outer sleeve, and the limiting ring limits a retracting travel end of the outer sleeve against the sliding rod.

7. The linear actuator of claim 6, wherein the limiting ring is threadedly connected onto the sliding rod.

8. The linear actuator of claim 6, wherein the sliding rod is provided with a connecting sleeve, an end of the connecting sleeve connects the sliding rod, another end of the connecting sleeve movably and connects the outer sleeve, and the limiting ring is connected onto the connecting sleeve.

9. The linear actuator of claim 8, wherein the limiting ring is threadedly connected onto the connecting sleeve.

* * * * *